Oct. 16, 1923.  1,471,214
G. S. SIEBEN
SAW FRAME OR HOLDER
Filed Sept. 30, 1922   2 Sheets-Sheet 1
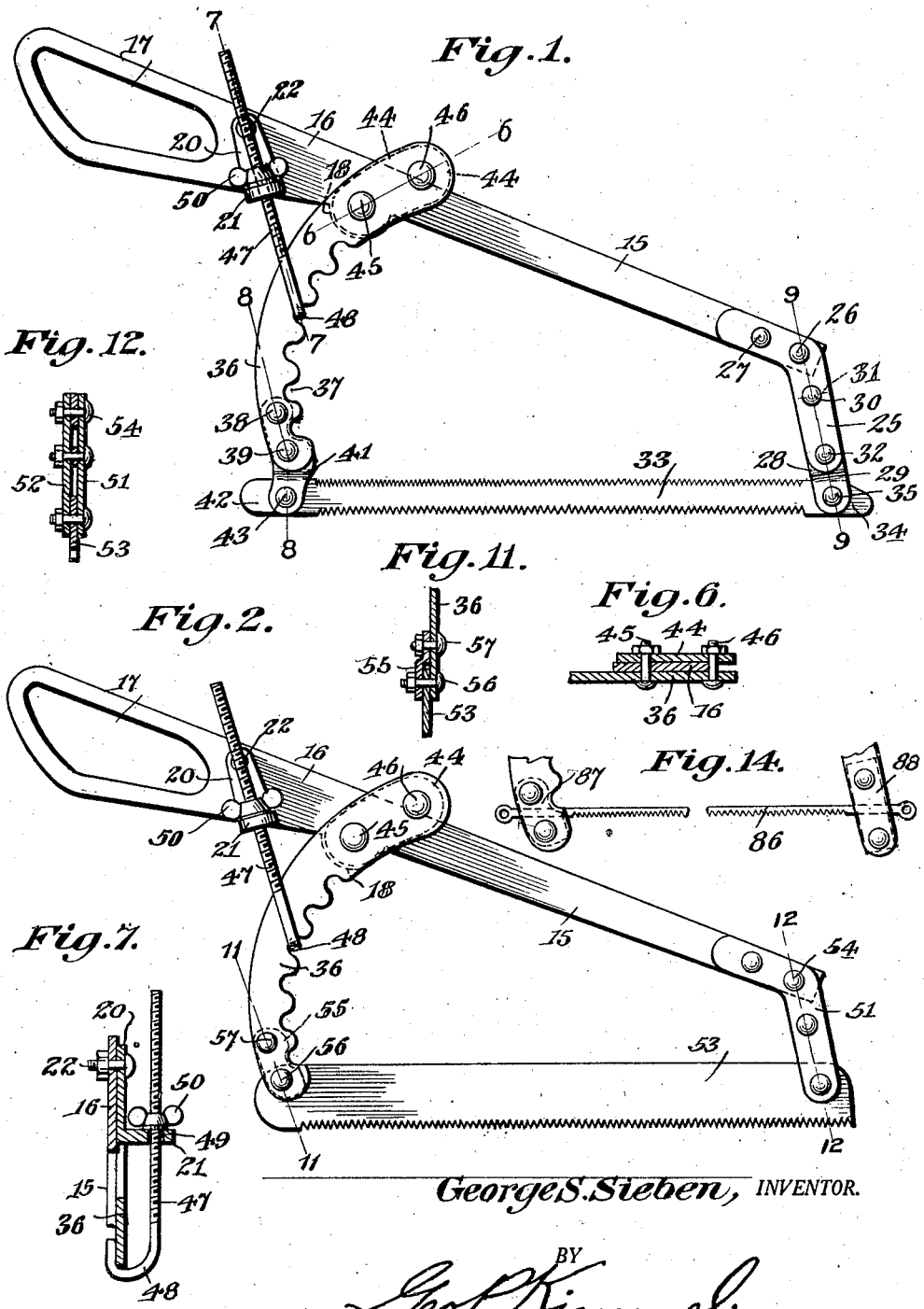
George S. Sieben, INVENTOR.
BY
Geo. F. Kimmel
ATTORNEY.

Oct. 16, 1923.
G. S. SIEBEN
SAW FRAME OR HOLDER
Filed Sept. 30, 1922
1,471,214
2 Sheets-Sheet 2
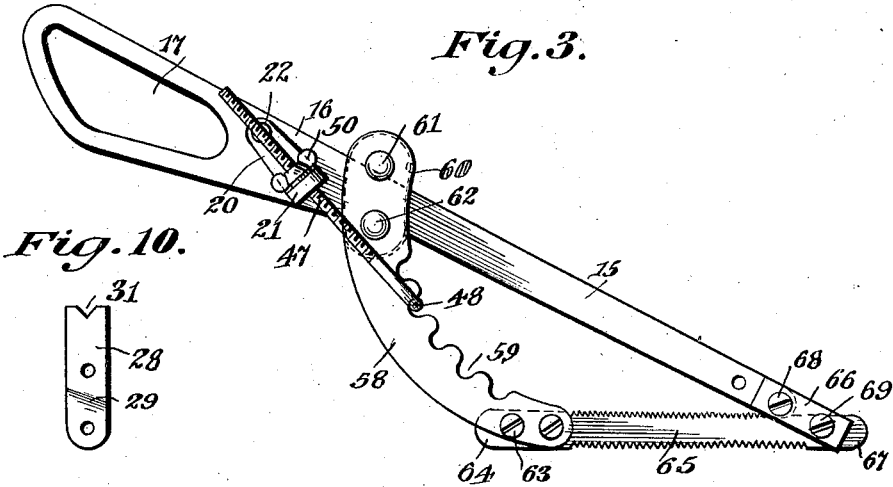
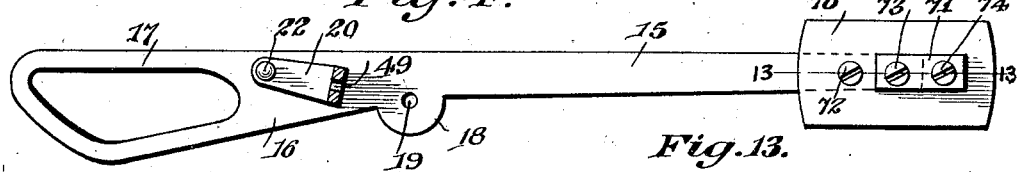
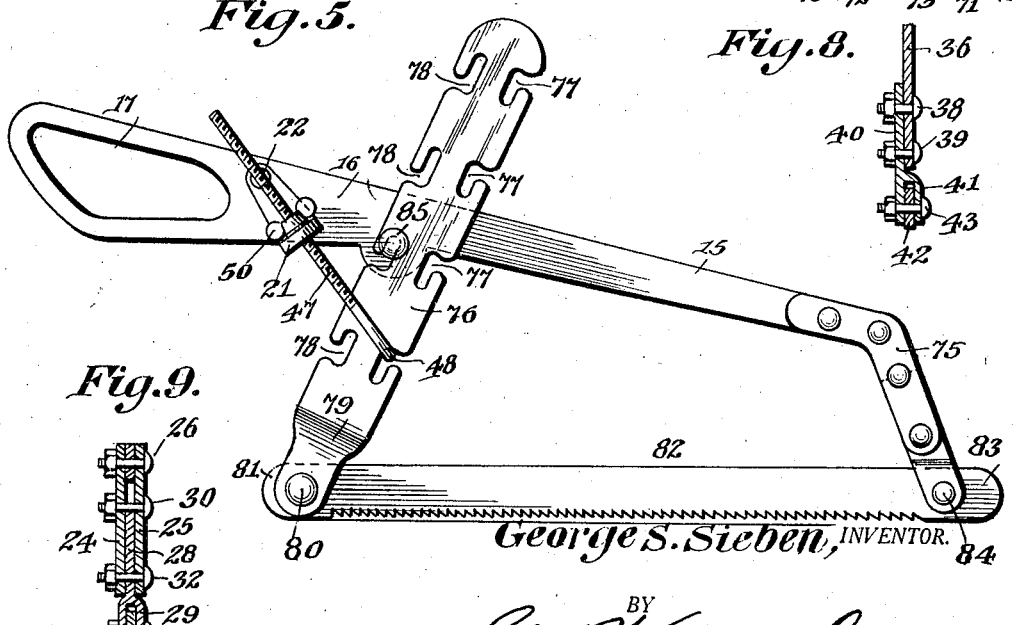
George S. Sieben, INVENTOR.
BY Geo. F. Kimmel ATTORNEY.

Patented Oct. 16, 1923.

1,471,214

UNITED STATES PATENT OFFICE.

GEORGE S. SIEBEN, OF OAK BLUFFS, MASSACHUSETTS.

SAW FRAME OR HOLDER.

Application filed September 30, 1922. Serial No. 591,670.

*To all whom it may concern:*

Be it known that I, GEORGE S. SIEBEN, a citizen of the United States, residing at Oak Bluffs, in the county of Dukes and State of Massachusetts, have invented certain new and useful Improvements in Saw Frames or Holders, of which the following is a specification.

This invention relates to saw frames or holders, and has for its object to provide a device of such class, in a manner as hereinafter set forth, with means for rendering the saw frame adjustable, whereby different lengths as well as types of saw blades can be secured therewith, and to further provide the device, in a manner as hereinafter referred to, with means for securely and adjustably connecting the saw blade in position to prevent any possibility of it becoming loose during the operation thereof.

A further object of the invention is to provide a saw frame or holder, in a manner as hereinafter set forth, with means for hanging the blade at an angle to facilitate the sawing action thereof as it provides for the teeth to hang close to the work during the forward movement of the blade and to cause the separated particles to be drawn off on the rearward movement of the blade, under such conditions, expediting the sawing operation and reducing the time under ordinary conditions, required to complete the severing or sawing of the object operated on.

A further object of the invention is to provide a device of such class, in a manner as hereinafter set forth, with adjustable means for holding a double edged ribbon saw blade, a common saw blade, a safety razor blade, a dental saw blade, a hack saw blade, a jig saw blade, or any other type or form of blade for which the device is found applicable.

Further objects of the invention are to provide an adjustable saw frame which is simple in its construction and arrangement, strong, durable, compact, efficient and convenient in its use readily assembled and comparatively inexpensive.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings, wherein like reference characters denote corresponding parts throughout the several views:—

Figure 1 is an elevation of a saw frame or holder, in accordance with this invention, showing the adaptation thereof in connection with a double edged ribbon saw blade, Figure 2 is an elevation of a modified form of saw blade, in accordance with this invention, showing the adaptation thereof in connection with a common saw blade, Figure 3 is a like view, of another modified form of adjustable saw frame or holder, in accordance with this invention, showing the adaptation thereof in connection with a dental saw blade, Figure 4 is a side elevation of the handle of the form of frame shown in Figure 3, and showing the adaptation thereof in connection with a safety razor blade, Figure 5 is an elevation of another modified form of adjustable saw frame or holder in accordance with this invention, showing, the adaptation thereof in connection with a hack saw, Figure 6 is a section on line 6—6, Figure 1,
Figure 7 is a section on line 7—7, Figure 1,
Figure 8 is a section on line 8—8, Figure 1,
Figure 9 is a section on line 9—9, Figure 1,
Figure 10 is a detail in plan of one of the sections of the forward coupler employed with the forms illustrated by Figures 1 and 5,
Figure 11 is a section on line 11—11, Figure 2,
Figure 12 is a section on line 12—12, Figure 2,
Figure 13 is a section on line 13—13, Figure 4,
Figure 14 is a fragmentary view in elevation, showing the adaptation of the device in connection with a jig saw.

Referring to Figures 1, 2, 3, 4 and 5 of the drawings, the saw frame or holder comprises a handle member consisting of a flat tapered back-bar 15, which merges into a substantially triangular shaped handle portion 16, provided with an enlarged opening 17, to facilitate the gripping of the handle member. The inner edge of the handle portion 16, at the inner terminus thereof is offset to provide a semi-circular projection 18, which is provided with an opening 19, The apertured projection 18, is best shown in Figure 4, of the drawings.

The handle portion 16 of each handle member has fixedly secured thereto, in proximity to the opening 17, a bracket 20, provided with apertured flange 21. The brackets 20, in the forms shown in Figures 1 and 2 are disposed at a like inclination with respect to the handle member, but with reference to the forms shown in Figures 3, 4 and 5, the brackets are adjusted to a different inclination with respect to each other and also at a different inclination with respect to the inclination of the brackets 20, employed in the forms shown in Figures 1 and 2. The construction of the brackets, irrespective of what form they are employed with, are alike and the means for fixedly securing each of the brackets 20, in position, is indicated at 22.

The handle members shown in connection with the forms illustrated by Figures 1, 2, 3, 4 and 5 are alike.

Referring to Figures 1, 6, 7, 8 and 9, the saw frame or holder not only includes a handle member, but also an adjustable rear coupler and a stationary forward coupler. The stationary forward coupler consists of a pair of opposed angle shaped sections 24, 25, which overlap the forward end of the shank 15, as well as projecting downwardly therefrom, and are further detachably connected to the forward end of the shank 15, by the removable securing devices 26, 27, which extend through the sections 24, 25, and also through the shank 15. Arranged between the sections 24, 25, as well as depending therefrom, is a bar 28, having a bifurcated lower end 29. The sections 24, 25, are connected together by the removable securing device 30, and against which abuts the upper end of the bar 28. The top edge of the bar 28, is notched, as at 31, so as to engage around the securing device 30. The bar 28, is connected to the sections 24, 25, by removable securing device 32, which extends through the sections 24, 25. Extended through the furcations formed on the lower end of the bar 28, is one end of a saw blade 33, as illustrated of the double edged ribbon type. That end of the blade 33, which extends in the furcation at the lower end of the bar 28, is indicated at 34, and is detachably secured to the bar 28, by the removable securing device 35.

The rear coupler, which as before stated is adjustable, is arcuate in contour, and consists of an elongated curved member 36, having its forward edge notched as at 37. The width of the member 36, gradually increases from its lower to its upper end and projects above the handle member. Secured to the lower end of the member 36, by the removable hold-fast devices 38, 39, is a depending bar 40, having a bifurcated lower end, as indicated at 41. The other end 42, of the saw blade 33, extends in the furcations at the lower end of the bar 40, and is connected therewith by the removable securing device 43. Associated with the upper end of the member 36, is a curved clamping plate 44, which is arranged against the handle member on that side opposite the side on which is arranged the upper end of the member 36. A securing device 45, extends through the plate 44, apertured lugs 18, and member 36. The securing device 45, is removable and also provides a pivot for the rear coupler. A removable securing device 46, is provided and which extends through the plate 44, and the upper end of the member 36, and normally bears against the edge of the handle member.

The rear coupler is fixedly secured in position, after the blade 33, has been secured thereto and to the forward coupler through the medium of an adjustably threaded clamping bar 47, the latter has a hooked lower end 48, for engaging in the notched edge 37, of the member 36. The bar 47, is threaded and extends through the opening 49, in the flange 21, and carries an adjusting nut 50, which when screwed home in a manner as indicated in Figure 1, as well as Figures 2, 3 and 5, the rear coupler will be fixedly maintained in position.

In each of the forms of the device as shown, a clamping bar 47, is employed and is indicated by the same reference character.

Referring to Figures 2, 11 and 12 of the drawings, the construction is somewhat similar to that shown in Figure 1, with this exception, that the bar 28 is dispensed with with respect to the front coupler. In Figs. 2, 11 and 12, the front coupler consists solely of a pair of angle shaped sections 51, 52, which oppose each other and are arranged against each side of the shank 15, and also against each side of the saw blade 53. Removable securing devices 54 are employed for securing the sections 51 and 52, together and for further securing said sections to the shank 15 and to a saw blade 53, of the common saw type. With respect to the rear coupler shown in Figure 2, it is the same as that illustrated in connection with Figure 1, with this exception, that the bar 48, is dispensed with and in lieu thereof, a plate 55, is provided and which is arranged at the rear of the member 36. The saw blade 53, is interposed between the plate 55, and the member 36 and secured therewith by the removable securing device 56. The securing device 56, also connects the plate 55 and member 36 together and further said plate 55 is connected to the member 36, by a securing device 57. Otherwise than that as stated, the construction shown in Figure 2, is the same as that illustrated by Figure 1.

Referring to Figure 3 of the drawings, the rear coupler consists of an elongated arcuate member 58, having its forward edge corrugated or toothed as at 59, and associated with the upper end of the member 58, is a plate 60. The member 58 projects above and is arranged on one side of the handle member and the plate 60 is arranged on the other side of the handle member. The member 58, and the plate 60, are connected together by the removable securing devices 61, 62. The device 62 forms a pivot and extends through the apertured projection 18. The lower end of the member 58, is formed with a pair of openings and through which extend the securing devices 63, for connecting the end 64, of a saw blade 65, therewith. The blade 65, as illustrated is what may be termed a dental saw blade. The forward coupler consists of a pair of rectangular plates 66, which are secured to and project from the forward end of the handle member. A removable securing device 68, is employed for connecting the forward coupler to the handle member. The forward coupler straddles the end 67, of the blade 65, and is secured thereto by a removable securing device 69. A clamping bar 47, is employed for fixedly securing the rear coupler in position.

Referring to Figure 4 of the drawings, there is illustrated as attached to the handle member a safety razor blade 70, which is secured in position by the forward coupler 71, in connection with the securing devices 72, 73 and 74. The securing device 73, extends through the sections which constitute the forward coupler and also through the handle member and the blade 70. The securing device 74, extends through the forward coupler and the blade 70 and the securing device 72, extends through the blade 70, and the handle member.

Referring to Figure 5 of the drawings, the forward coupler is similar in construction as the forward coupler illustrated by Figures 1 and 9, and is referred to generally by the reference character 75. The rear coupler consists of a rectangular bar 76, having each side edge provided with a series of angle shaped slots. The slots at one side edge are indicated at 77, and the slots at the other side edge by the reference character 78. The slots 77, are oppositely disposed with respect to the slots 78. The lower end of the bar 77, is reduced, as indicated at 79, and is removably connected by the securing device 80, to the end 81, of a hack saw blade 82. The forward end of the blade 82 is indicated at 83, and is removably connected by the securing device 84, to the forward coupler. Carried by the apertured projection 18, is a headed stud 85, which is adapted to engage in one of the slots 78 for the purpose of adjustably positioning the rear coupler. The slots 77, at the forward edge of the rear coupler, are adapted to receive the clamping rod 47, for the purpose of fixedly securing the rear coupler in its adjusted position.

Referring to Figure 14, the rear coupler, as well as the forward coupler, is constructed in a manner as that referred to in connection with Figure 2 and the said front and rear couplers are illustrated as connecting a jig saw 86, in position. The rear coupler is indicated at 87, and the forward coupler at 88.

From the foregoing construction and arrangement of parts, it is obvious that a saw frame or holder is set up which can be employed for securing a saw blade in adjusted position, and further for securing the blade to reduce to a minimum the possibility of becoming loosened during the sawing and cutting operation and although the drawings illustrate the preferred embodiment of the invention, yet it is to be understood that various changes in the details of construction can be made without departing from the spirit of the invention.

What I claim is:—

1. A device for the purpose set forth comprising a handle member including a tapered shank and a triangular handle portion, a rear coupler adjustably connected therewith and adapted to be attached to one end of a saw blade, a forward coupler detachably secured therewith and adapted to be connected to the other end of a saw blade, and lengthwise adjustable means carried by the handle member and overlapping and engaging in the rear coupler for clamping the latter to the handle portion.

2. A device for the purpose set forth comprising a handle member, a rear coupler adjustably connected therewith and adapted to be attached to one end of a saw blade, a forward coupler projecting from the forward end of a handle member and adapted to be attached to the other end of a saw blade, and lengthwise adjustable means carried by the handle member and overlapping and engaging in the rear coupler for attaching the latter to the handle member, said means disposed at an inclination with respect to said handle member.

3. A device for the purpose set forth comprising a handle member, a rear coupler adjustably connected therewith and adapted to be attached to one end of a saw blade, a forward coupler projecting from the forward end of a handle member and adapted to be attached to the other end of a saw blade, and lengthwise adjustable means disposed at an inclination with respect to and carried by the handle member and engaging in the rear coupler for attaching the latter to the handle member, said handle member including a handle portion provided with an opening.

4. A device for the purpose set forth comprising a handle member, a rear coupler adjustably connected with and depending from said handle member, said coupler being curvilinear in contour and having its forward edge notched, a forward coupler projecting from the forward end of the handle member, said couplers adapted to be detachably secured to the ends of the saw blade and adjustable means carried by the handle member and engaging the notched edge of the rear coupler for clamping it to the handle member.

5. A device for the purpose set forth comprising a handle member, a rear coupler depending therefrom and having notches, means for pivotally connecting said coupler with said handle member, a forward coupler projecting from the forward end of the handle member, said couplers adapted to be detachably secured to the ends of the saw blade, and lengthwise adjustable means carried by the handle member and engaging in a notch of the rear coupler for clamping it to the handle member.

6. A device for the purpose set forth comprising a handle member, a rear coupler extended therefrom and provided with notches, means for pivotally connecting said coupler with said handle member, means for connecting one end of a saw blade with the forward end of a handle member, means for connecting the other end of a saw blade to said coupler, and an adjustable means provided with a lengthwise adjustable element, said means carried by the handle member and said element engaging in one of the notches of the coupler for clamping the latter to the handle member.

7. A device for the purpose set forth comprising a handle member, a rear coupler extended therefrom and provided with notches, means for pivotally connecting said coupler with said handle member, means for connecting one end of a saw blade with the forward end of a handle member, means for connecting the other end of a saw blade to said coupler, and an adjustable means provided with a lengthwise adjustable element, said means carried by the handle member and said element engaging in one of the notches of the coupler for clamping the latter to the handle member, said means disposed at an inclination with respect to said handle member.

In testimony whereof, I affix my signature hereto.

GEORGE S. SIEBEN.